(12) United States Patent
Standish et al.

(10) Patent No.: US 7,333,320 B2
(45) Date of Patent: Feb. 19, 2008

(54) SYSTEMS AND METHODS FOR LIFTING A TERMINAL ENCLOSURE IN BELOW GROUND APPLICATIONS

(75) Inventors: Craig M. Standish, Waconia, MN (US); Troy Land, Shakopee, MN (US); Ajay Sharma, Prior Lake, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 274 days.

(21) Appl. No.: 11/137,132

(22) Filed: May 25, 2005

(65) Prior Publication Data

US 2006/0268495 A1 Nov. 30, 2006

(51) Int. Cl.
*H02B 1/04* (2006.01)

(52) U.S. Cl. .................... 361/636; 174/37; 174/38; 174/651; 361/641; 385/135; 385/147; 439/131

(58) Field of Classification Search ............... 174/37, 174/38, 651; 361/363, 641; 385/134–135; 439/131
See application file for complete search history.

(56) References Cited

U.S. PATENT DOCUMENTS

| | | | | |
|---|---|---|---|---|
| 4,884,863 A | * | 12/1989 | Throckmorton | 385/135 |
| 5,069,516 A | * | 12/1991 | Kohy et al. | 385/147 |
| 5,189,723 A | | 2/1993 | Johnson et al. | |
| 5,939,669 A | | 8/1999 | Finzel et al. | |
| 6,031,180 A | * | 2/2000 | Schilling et al. | 174/37 |
| 6,316,728 B1 | * | 11/2001 | Hoover et al. | 174/651 |
| 2004/0063076 A1 | | 4/2004 | Van Leest | |

FOREIGN PATENT DOCUMENTS

DE  41 40 701 C1  12/1992
EP  0 840 420 A1  5/1998

OTHER PUBLICATIONS

"Ball Screws," p. 976, McMaster-Carr.
"Steel Roller Track for Doors," p. 2723, McMaster-Carr.
"Outside Plant FiberSeal® Terminal Enclosure Below Ground Application Installation Guide," ADCP-93-019, 1st Edition, Issue 4, ADC Telecommunications, pp. i-iv, 1-20 (Oct. 1997).

* cited by examiner

*Primary Examiner*—Gregory D Thompson
(74) *Attorney, Agent, or Firm*—Merchant & Gould P.C.

(57) ABSTRACT

A fiber distribution terminal system includes a below ground vault, and a terminal enclosure within the vault. The system also includes a lift system in the vault, the lift system including a screw drive and a track system. Rotation of the screw drive lifts the terminal enclosure from a below ground to a lifted position, and the track system guides the terminal enclosure as the enclosure is lifted. The system also includes a tool such as a cordless drill to drive the screw drive. The screw drive can include a ball screw and a ball nut. The system can include a bracket to couple the terminal enclosure to the screw drive and the track system. The track system can include two sets of tracks, a first set of tracks that is fixed in the vault, and a second set of tracks that is coupled to the first set of tracks.

19 Claims, 4 Drawing Sheets

US 7,333,320 B2

SYSTEMS AND METHODS FOR LIFTING A TERMINAL ENCLOSURE IN BELOW GROUND APPLICATIONS

TECHNICAL FIELD

The present application relates to terminal enclosures in below ground applications. More particularly, the present application relates to systems and methods used to lift terminal enclosures located in below ground vaults.

BACKGROUND

Terminal enclosures located outside provide a protected and environmentally secure system for management and administration of fiber optic cables. Such terminal enclosures are typically located above ground or below ground in vaults. In below ground applications, it is desirable to provide access to the terminal enclosures so that modifications to the fiber optic terminations in the terminal enclosure can be made.

SUMMARY

Embodiments of the present invention provide systems and methods for lifting terminal enclosures located in below ground vaults.

In one embodiment, a fiber distribution terminal system includes a below ground vault, a terminal enclosure positioned within the vault, and a lift system positioned within the vault, the lift system including a screw drive and a track system, wherein rotation of the screw drive lifts the terminal enclosure from a below ground position to a lifted position, and wherein the track system guides the terminal enclosure as the terminal enclosure is lifted.

In another embodiment, a fiber distribution terminal system for use with a terminal enclosure includes a below ground vault, and a lift system positioned within the vault, the lift system including a screw drive and a track system, wherein rotation of the screw drive lifts the terminal enclosure from a below ground position to a lifted position, and wherein the track system guides the terminal enclosure as the terminal enclosure is lifted. The screw drive includes a ball screw and a ball nut, the ball nut is coupled to a bracket that is coupled to the terminal enclosure. A power tool is attachable to the screw drive to turn the screw drive, and the track system includes two sets of tracks, a first set of tracks that is fixed in the vault, and a second set of tracks that is coupled to the first set of tracks.

In another embodiment, a method for lifting a terminal enclosure from a below ground vault includes: providing a lift system in the vault, the lift system including a screw drive and a track system; lifting the terminal enclosure at least partially out of the vault using the screw drive; and allowing the terminal enclosure to ride along the track system as the terminal enclosure is lifted out of the vault.

DETAILED DESCRIPTION

Figure 1:
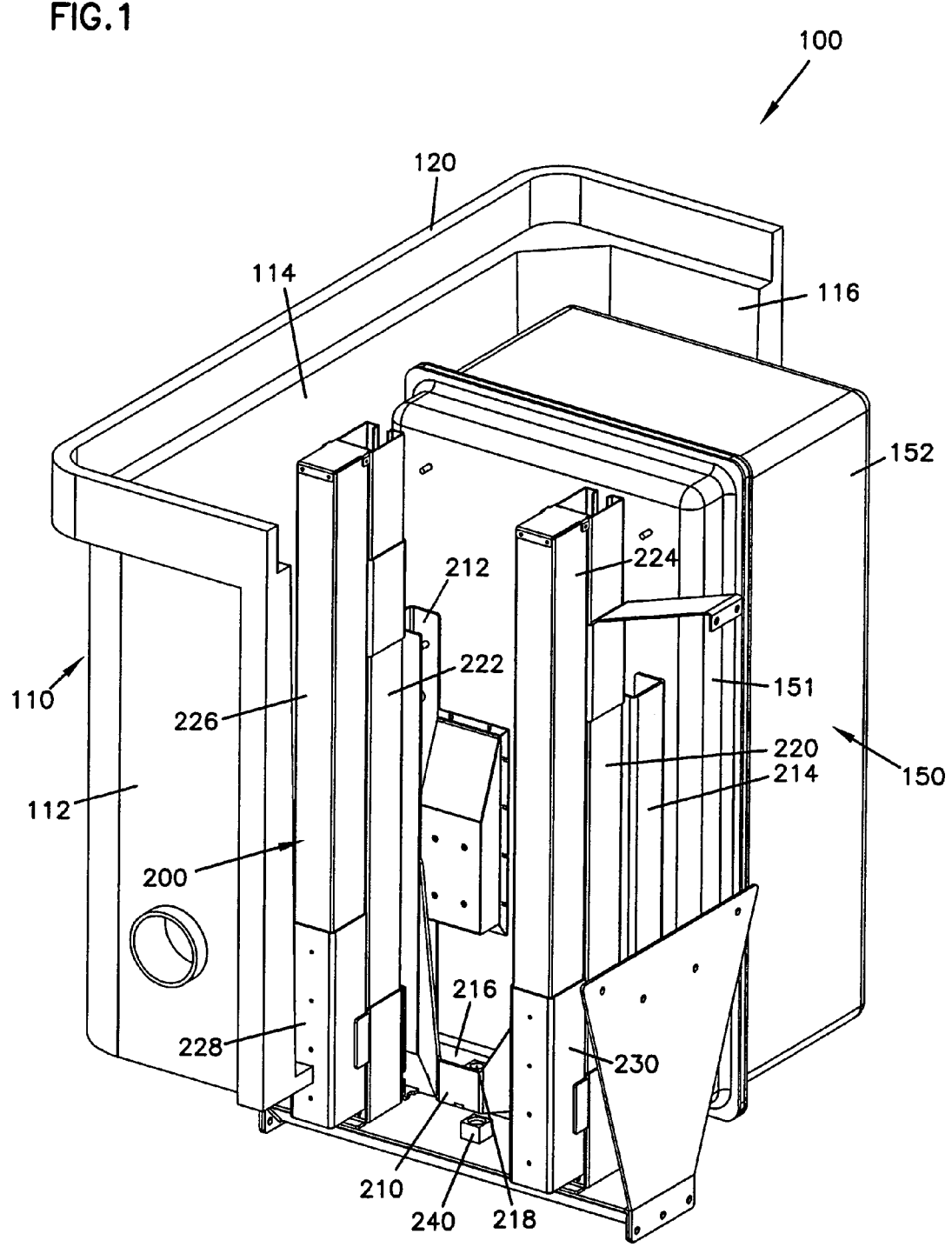
FIG. 1 is a perspective view of a terminal enclosure located in a below ground vault.

Referring now to FIG. 1, an example of a fiber distribution terminal system 100 including a vault 110 and a terminal enclosure 150 is shown. Vault 110 is shown in partial cutaway form, including side 114 and partial views of sides 112, 116. Vault 110 typically surrounds terminal enclosure 150, including full sides 112, 116 connected to another side (not shown) opposite to that of side 114. In the examples shown, vault 110 is located below ground, so that an upper edge 120 of vault 110 is located substantially at ground level, and a cover (not shown) is typically placed over vault 110 to protect the terminal enclosure 150 located within vault 110.

In one example, vault 110 is an enclosure manufactured by Strongwell Corporation of Lenoir City, Tenn. In the example shown, vault 110 is 30" W×48" L×36" D. Others types and sizes of vaults can be used.

Terminal enclosure 150 generally includes a main body 151 and a cover 152 positioned over a portion of main body 151. Cover 152 can be removed from main body 151 by, for example, pivoting cover 152 away from main body 151 to provide access to a plurality of fiber optic terminations or other telecommunications connections or equipment within main body 151. Terminal enclosure 150 provides a watertight enclosure to protect fiber optic terminations made therein.

In one example, main body 151 includes an interconnect panel such as the Customer Interconnect Panel (CIP) and/or one or more cross-connect panels such as the AGX-1000HD, the Outside Plant 72-or 96-Fiber Connector Modules (OCM), or the BGX-432, all manufactured by ADC Telecommunications, Inc. of Eden Prairie, Minn. In one example, main body 151 has a 432-fiber capacity and weighs approximately 125 lbs. Other types of panels can also be provided in main body 151.

For example, main body 151 can include a plurality of interconnect or cross-connect termination panels that provide cable management and terminate a plurality of fiber optic cables from a central location such as a central office. Main body 151 also provides connections for fiber optic cables running from main body 151 to a plurality of end terminations such as homes or buildings.

Referring now generally to FIGS. 1-4, a technician can access terminal enclosure 150 to modify fiber optic terminations made therein. Because terminal enclosure 150 is positioned below ground in vault 110, mechanisms are provided to lift terminal enclosure 150 out of the vault 110 so that main body 151 of terminal enclosure 150 can be accessed above ground.

Referring again to FIG. 1, terminal enclosure 150 is shown in vault 110 below ground. A system 200 is shown that allows terminal enclosure 150 to be lifted out of vault 100. See generally FIGS. 3 and 4. System 200 generally includes a bracket 210, tracks 220, 222, 224, 226, a screw 260, and a torque mechanism such as a tool 280 that allow terminal enclosure 150 to be lifted out of vault 110 to at least a partially above ground position so that terminal enclosure 150 can be accessed.

Bracket 210 includes rails 212, 214 that are coupled to main body 151 of terminal enclosure 150. Bracket 210 also includes a base 216 with an aperture. In one example, the aperture is formed by a ball nut 218 including a plurality of ball bearings for use with screw 260, as described further below.

Tracks 220, 222 are mounted in vault 110. Tracks 224, 226 are positioned adjacent tracks 220, 222 while in a stored position. See FIG. 1. When terminal enclosure 150 is to be lifted, tracks 224, 226 are mounted to free ends of tracks 220, 222 using sleeves 228, 230. In one example, screws are placed in sleeves 228, 230 to couple tracks 224, 226 to tracks 220, 222. When tracks 224, 226 are coupled to tracks 220, 222, two elongated tracks with grooves 232 are formed. See FIG. 2. Tracks 220, 222, 224, 226 are sized so that tracks 224, 226 extend out of vault 110 when coupled to tracks 220, 222. See FIGS. 2 and 3.

Rails 212, 214 of bracket 210 are slidingly coupled to tracks 220, 222 by sets of hangers 234, 236 to generally form an enclosed roller system. See FIG. 4. Hangers 234, 236 include wheels 238 that ride in tracks 220, 222, 224, 226, and arm portions 239 that extend through and slide in grooves 232 to allow bracket 210 and terminal enclosure 150 to ride along tracks 220, 222, 224, 226 as bracket 210 and terminal enclosure 150 are lifted out of vault 110, as described below. In the example shown, two vertically spaced hangers are used to couple each rail 212, 214 to respective tracks 220, 222, 224, 226, and each hanger includes two pairs of wheels 238.

In one example, tracks 220, 222, 224, 226 each include a six-foot section having a 2⅝" W and 3¼" H and a 0.094" thickness and are available under part number 1207A41 from McMaster-Carr Supply Company of Atlanta, Ga. In addition, in one example, hangers 234, 236 have steel roller bearings, include 3" wheel diameters, and are available under part number 1215A26 from McMaster-Carr. Other types and sizes for tracks 220, 222, 224, 226 can be used.

Figure 2:
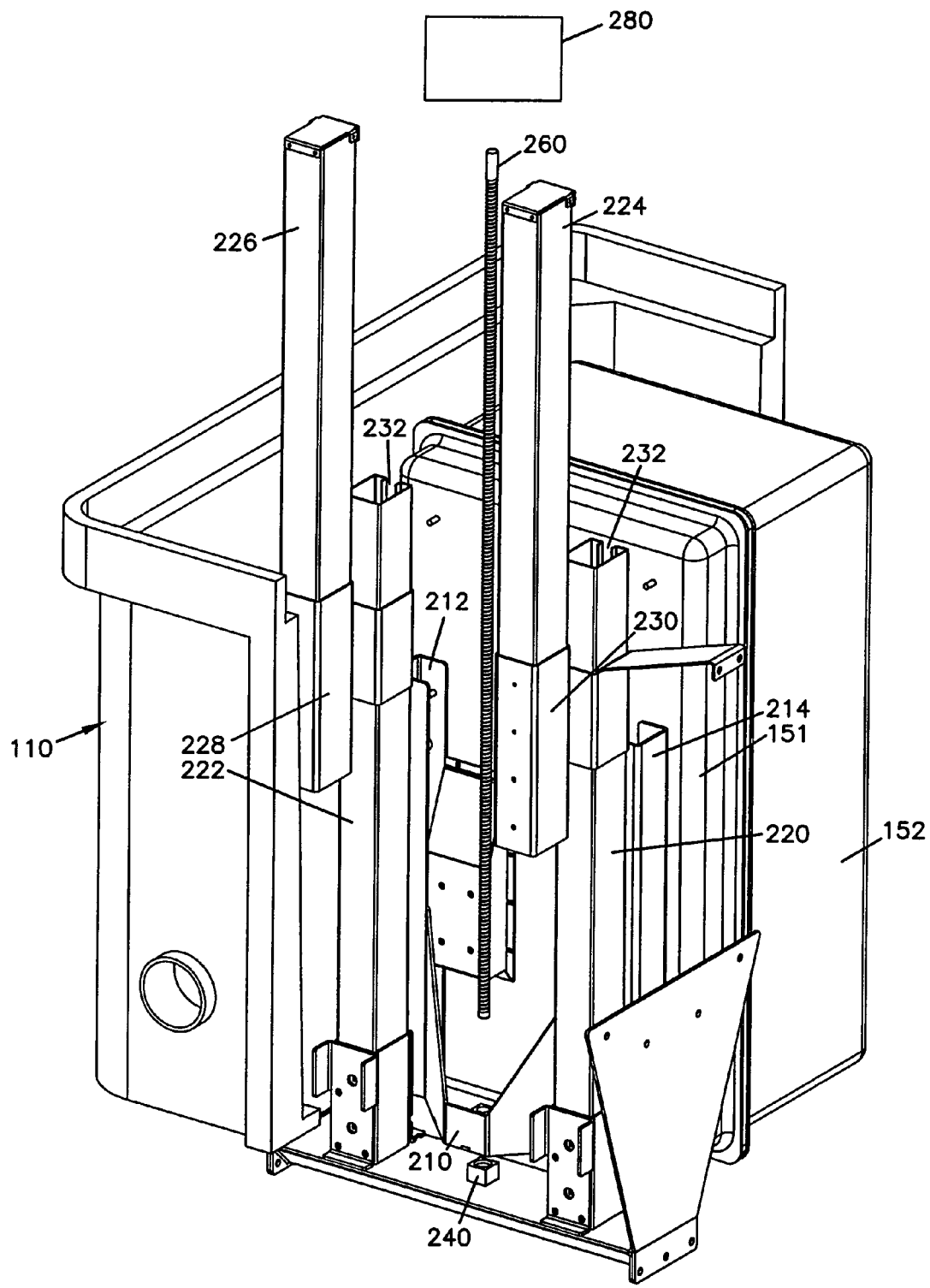
FIG. 2 is a partially exploded perspective view of the terminal enclosure and vault of FIG. 1.
Figure 3:
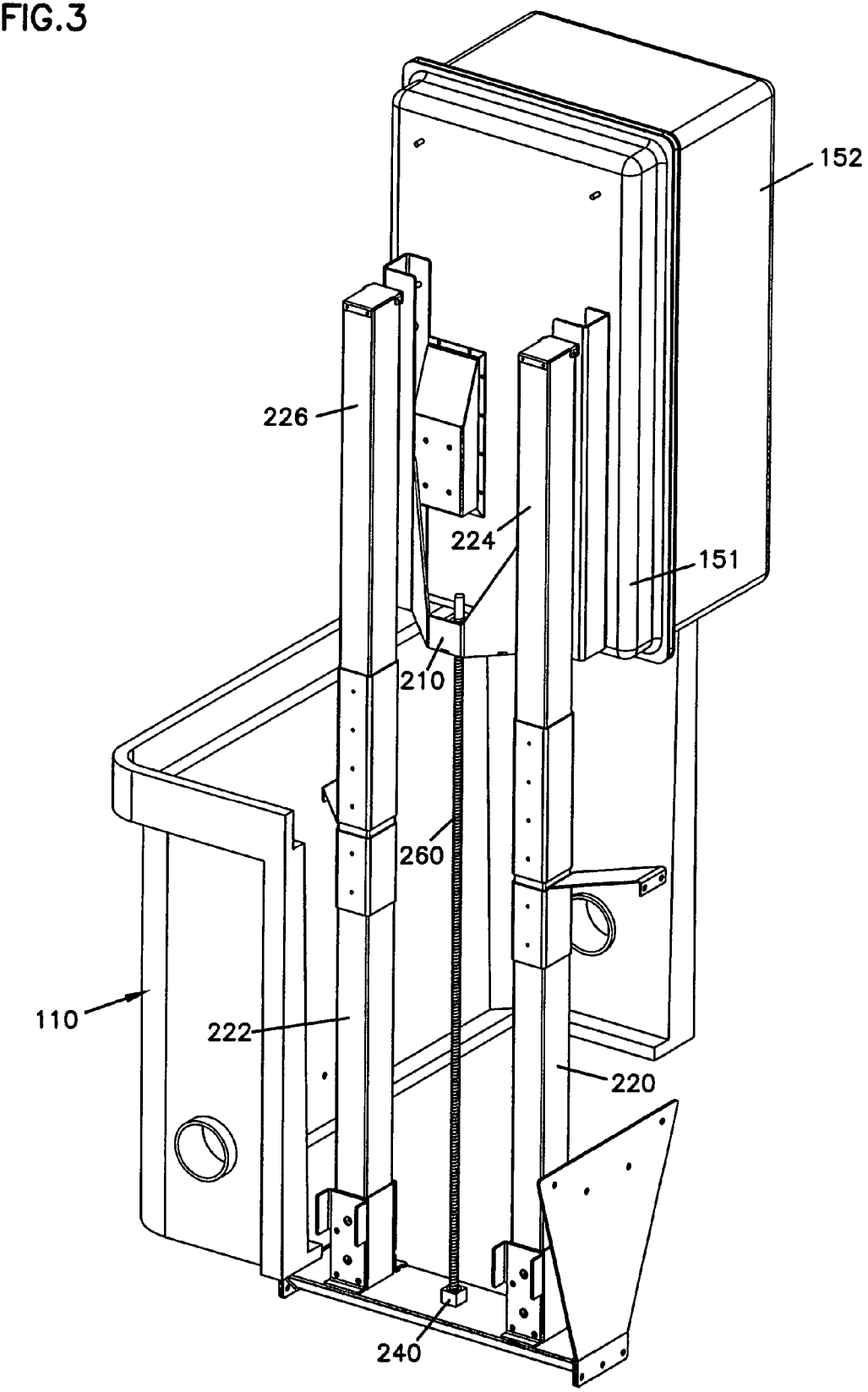
FIG. 3 is a perspective view of the terminal enclosure and the vault of FIG. 1 with the terminal enclosure in the lifted position.
Figure 4:
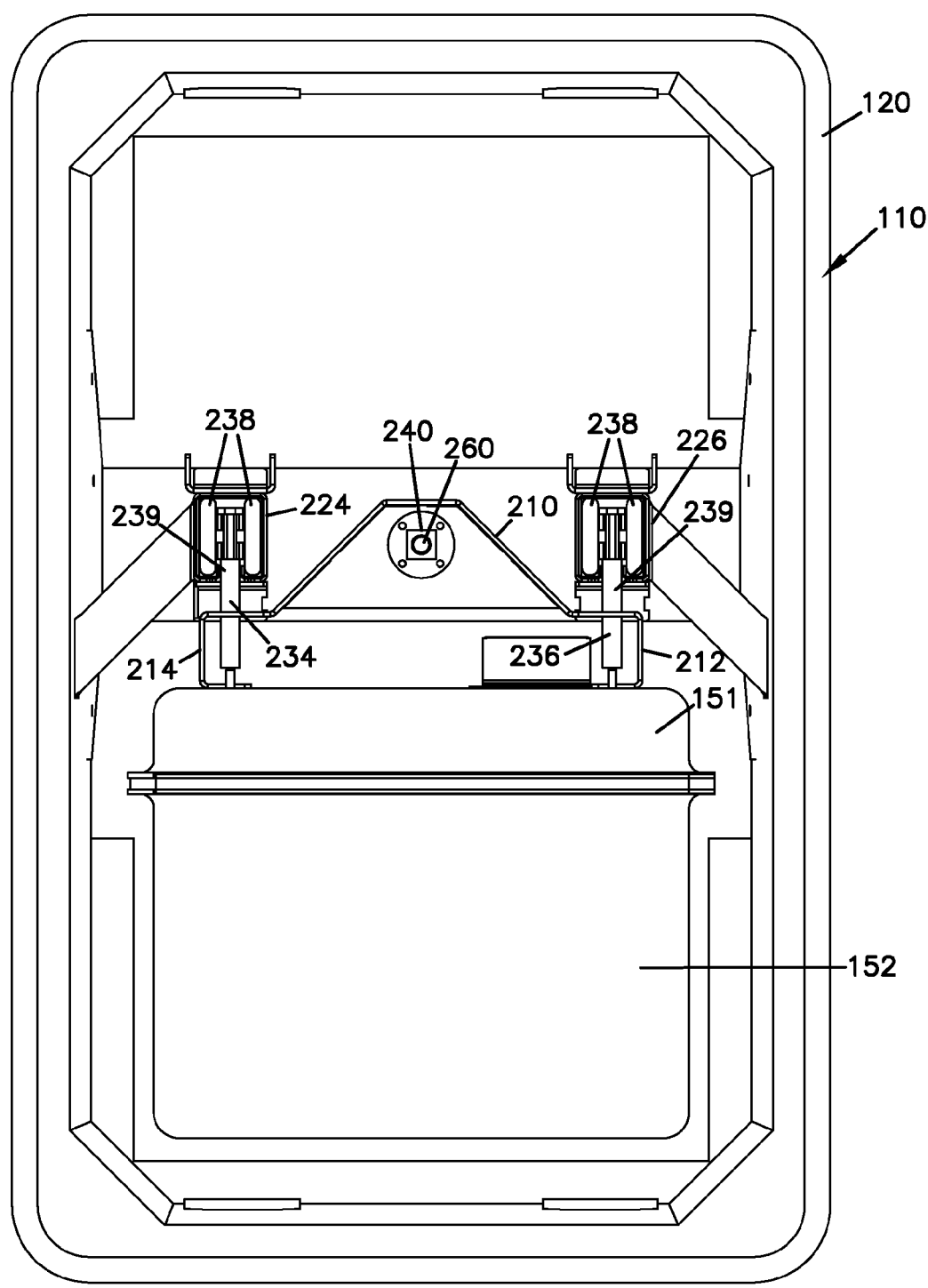
FIG. 4 is a top view of the terminal enclosure and the vault of FIG. 3.

Referring now to FIGS. 2 and 3, screw 260 is introduced into vault 110 and threaded through ball nut 218 and into a mounting block 240 that generally holds the end of screw 260 in position and minimizes wobble. The length of screw 260 is sized so that screw 260 extends out of vault 110 so that terminal enclosure 150 rides along screw 260 out of vault 110, as described below. For example, the length of screw 260 can be sized to correspond to the height of tracks 220, 222, 224, 226 so that as screw 260 causes terminal enclosure 150 to be lifted, hangers 234, 236 ride along grooves 232 and in tracks 220, 222, 224, 226 from the below ground position to the lifted position, as described below. See FIG. 3.

In one example, screw 260 is a ball screw that is threaded through the ball bearings in ball nut 218 to minimize friction. In one example, ball screw 260 has a ⅝" diameter and ¹³⁄₆₄" screw lead and is available under part number 5966K26, and mounting block 240 is available under part number 60755K13, both from McMaster-Carr. In addition, in one example, ball nut 218 likewise has a diameter of is ⅝" and ¹³⁄₆₄" screw lead and is available under part number 5966K16 from McMaster-Carr.

With ball screw 260 in place as shown in FIG. 3, ball screw 260 can be rotated in a first direction to cause ball nut 218 on bracket 210 to ride upwardly along ball screw 260. As ball nut 218 rides along ball screw 260, bracket 210 rises, causing bracket 210 and terminal enclosure 150 to be guided by tracks 220, 222, 224, 226 upwardly out of vault 110 from the below ground position to the lifted position.

To lower terminal enclosure 150 back into vault 110 from the lifted position to the below ground position, ball screw 260 is rotated in a second direction opposite to that of the first direction to cause ball nut 218 on bracket 210 to ride downwardly along ball screw 260. As ball nut 218 ride along ball screw 260, bracket 210 lowers, causing bracket 210 and terminal enclosure 150 to be guided by tracks 220, 222, 224, and 226 downwardly into vault 110.

In the example shown, ball screw 260 is driven in the first and second directions using a tool 280 such as a portable drill. In one example, tool 280 is a cordless hand drill. In one example, tool 280 can be directly coupled to the screw 260 to rotate screw 260. In other examples, tool 280 can be coupled to a specialized bit that is, in turn, coupled to the screw 260. Other types of hand tools can also be used. In some embodiments, it is not necessary to drive ball screw 260 in the second direction. Instead, the weight of the terminal enclosure 150 can cause the terminal enclosure 150 and attached bracket 210 to slowly ride along ball screw 260 from the lifted position to the below ground position.

In use, vault 10 is typically accessed by removing a cover (not shown) therefrom. Then ball screw 260 is threaded through ball nut 218 and placed in mount 240. Next, tool 280 is coupled to ball screw 260 and is used to rotate ball screw 260 in a first direction. As ball screw 260 is rotated, ball nut 218 rides along ball screw 260, causing bracket 210 to rise and terminal enclosure 150 to be guided by tracks 220, 222, 224, 226 upwardly out of vault 110 from the below ground position to the lifted position. See FIGS. 1 and 3. In the lifted position, cover 152 can be removed from terminal enclosure 150 to allow access to main body 151.

To place terminal enclosure 150 back into vault 110, cover 152 is repositioned, and tool 280 is used to rotate ball screw 260 in a second direction opposite to that of the first direction to lower terminal enclosure 150 from the lifted position to the below ground position.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber distribution terminal system, comprising:
a below ground vault;
a terminal enclosure positioned within the vault; and
a lift system positioned within the vault, the lift system including a screw drive and a track system, wherein the track system comprises two rails, two tracks, and two hangers, each rail being slidingly coupled to a respective track by one of the hangers, wherein rotation of the screw drive lifts the terminal enclosure from a below ground position to a lifted position, and wherein the track system guides the terminal enclosure as the terminal enclosure is lifted.

2. The system of claim 1, further comprising a drill to drive the screw drive.

3. The system of claim 2, wherein the screw drive comprises a ball screw and a ball nut.

4. The system of claim 1, further comprising a bracket to couple the terminal enclosure to the screw drive and the track system.

5. The system of claim 1, wherein the screw drive comprises a ball screw, and wherein the ball screw is removable from the vault.

6. The system of claim 1, wherein the track system comprises two sets of tracks, a first set of tracks that is fixed in the vault, and a second set of tracks that is coupled to the first set of tracks.

7. The system of claim 6, wherein the second set of tracks extends out of the vault.

8. The system of claim 1, wherein the screw drive includes a ball screw, wherein the terminal enclosure is coupled to the track system using a bracket, and wherein the bracket includes a ball nut through which the ball screw is threaded.

9. The system of claim 8, wherein a lower end of the ball screw is positioned in a mounting block.

10. The system of claim 1, wherein each of the hangers comprises a wheel that rides in one of the tracks.

11. The system of claim 1, wherein each of the tracks comprises a groove.

12. The system of claim 11, wherein each of the hangers comprises an arm portion that extends through the groove in one of the tracks.

13. The system of claim 12, wherein each of the hangers comprises a wheel that rides in one of the tracks.

14. A fiber distribution terminal system for use with a terminal enclosure, comprising:
   a below ground vault; and
   a lift system positioned within the vault, the lift system including a screw drive and a track system, wherein rotation of the screw drive lifts the terminal enclosure from a below ground position to a lifted position, and wherein the track system guides the terminal enclosure as the terminal enclosure is lifted;
   wherein the screw drive comprises a ball screw and a ball nut, the ball nut being coupled to a bracket that is coupled to the terminal enclosure;
   wherein a power tool is attachable to the screw drive to turn the screw drive; and
   wherein the track system includes two sets of tracks, a first set of tracks that is fixed in the vault, and a second set of tracks that is coupled to the first set of tracks.

15. The system of claim 14, wherein the second set of tracks extends out of the vault.

16. A method for lifting a terminal enclosure from a below ground vault, the method comprising:
   providing a lift system in the vault, the lift system including a screw drive and a track system, wherein the screw drive includes a ball screw and a ball nut;
   lifting the terminal enclosure at least partially out of the vault using the screw drive; and
   allowing the terminal enclosure to ride along the track system as the terminal enclosure is lifted out of the vault.

17. The method of claim 16, wherein the screw drive includes a ball screw and a ball nut, and wherein the method further comprises rotating the screw drive using a cordless drill.

18. The method of claim 16, wherein the method further comprises rotating the screw drive using a cordless drill.

19. The method of claim 16, further comprising placing a first set of tracks on a second fixed set of tracks to form the track system.

* * * * *